United States Patent [19]
Angellotti et al.

[11] Patent Number: 5,920,445
[45] Date of Patent: Jul. 6, 1999

[54] FLEXURED MOUNTING SYSTEM FOR FRICTION REDUCTION AND FRICTION LINEARIZATION IN LINEAR ACTUATOR FOR DISK DRIVE

[75] Inventors: Thomas J. Angellotti, Ogden; John C. Briggs, Layton; Paul Johnson, Kaysville; David E. Jones, Layton; Carl F. Nicklos, Ogden; Mark S. Thayne, West Point; Yiping Ma, Layton, all of Utah

[73] Assignee: Iomega Corporation, Roy, Utah

[21] Appl. No.: 08/866,168

[22] Filed: May 30, 1997

[51] Int. Cl.$^6$ ............................... G11B 5/55; G11B 21/08
[52] U.S. Cl. .............................................................. 360/106
[58] Field of Search ............................. 360/106; 369/249

[56] References Cited

U.S. PATENT DOCUMENTS

| | | | |
|---|---|---|---|
| 4,504,879 | 3/1985 | Toldi et al. | 360/105 |
| 4,528,607 | 7/1985 | Thompson | 360/106 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,730,227 | 3/1988 | Chong et al. | 360/106 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,172,367 | 12/1992 | Hinotani | 360/104 |
| 5,291,359 | 3/1994 | Wolter | 360/104 |
| 5,508,864 | 4/1996 | Briggs et al. | 360/106 |
| 5,530,607 | 6/1996 | Spendlove | 360/105 |

FOREIGN PATENT DOCUMENTS

| | | |
|---|---|---|
| 0 329 234 A1 | 8/1989 | European Pat. Off. . |
| 195 36 172 A1 | 4/1996 | Germany . |

Primary Examiner—Robert S. Tupper
Attorney, Agent, or Firm—Woodcock Washburn Kurtz Mackiewicz & Norris LLP

[57] ABSTRACT

There is disclosed a disk drive having a linear actuator for carrying read/write heads into engagement with a recording medium. The heads are mounted on a carriage assembly along with a voice coil motor for driving the carriage assembly into and out of engagement of the heads with the medium. The carriage assembly slides linearly on a central guide track. A flexible mounting suspension is provided for the central guide track for linear movement by the carriage assembly so that initial linear movement of the carriage assembly is by flexing the suspension and further, larger linear movement of the carriage assembly is by sliding along the guide track. In one form of the invention the central guide track is suspended at the front end by a flexure and at the rear end by a bearing. In another form of the invention the central guide track is suspended at each end by a flexure.

14 Claims, 7 Drawing Sheets

FLEXURED MOUNTING SYSTEM FOR FRICTION REDUCTION AND FRICTION LINEARIZATION IN LINEAR ACTUATOR FOR DISK DRIVE

BACKGROUND OF THE INVENTION

This invention relates to a linear actuator for carrying read/write heads into engagement with a recording medium and more particularly, to a flexured mounting system for friction reduction and friction linearization in the linear actuator.

DESCRIPTION OF THE PRIOR ART

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk dries for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted in to the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. An example of such disk drive is shown in U.S. Pat. No. 5,508,864. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. The present invention addresses and overcomes one such problem.

One problem that a voice coil motor for a disk drive experiences is difficulty in handling both 1f and 2f runout during track following. A 1f runout occurs when the servo tracks of a disk-shaped storage medium are not exactly concentric with the center axis of the medium. A 2f runout occurs as a result of deformation of the media due to temperature increases within the disk drive. A 2f runout occurs at twice the frequency of 1f runout. In order to accommodate the short length of the drive required for use in laptop and notebook computers, the bearings that support the linear actuator must be moved closer together. This results in higher friction loads on the actuator bearings and higher off track error signal. The frictional loads increase at the inner tracks of the disk because the medial velocity is lower, resulting in more drag force on the heads. This makes it more difficult for the linear actuator to handle 1f and 2f runout during track following. It would be desirable to provide a central guide track on which an actuator carriage assembly carrying the heads slides linearly and a suspension flexibly mounting the central guide track for linear movement by the carriage assembly so that initial movement of the carriage assembly is by flexing the suspension and further, larger, linear movement of the carriage assembly is by sliding along the guide track.

SUMMARY OF THE INVENTION

In accordance with the present invention a disk drive having a linear actuator for carrying read/write heads into engagement with a recording medium is provided having a carriage assembly with the heads being mounted on the carriage assembly. A voice coil motor including a coil is mounted on the carriage assembly for driving the carriage assembly into and out of engagement of the heads with the medium. A central guide track is provided on which the carriage assembly slides linearly in a suspension flexibly mounting the central guide track for linear movement by the carriage assembly so that initial linear movement of the carriage assembly is by flexing the suspension and further, larger, linear movement of the carriage assembly is by sliding along the guide track. This enables the linear actuator to adequately handle both 1f and 2f runout during track following. In accordance with one aspect of the invention the central guide track is suspended at at least one end by a flexure. In accordance with another aspect of the invention the central guide track is suspended at the front end by a flexure and at the rear end by a bearing. Stop means are provided at both ends of the central guide track to limited the travel to a predetermined distance.

For a more detailed disclosure of the invention and for further objects and advantages thereof, reference is to be had to the following description taken in conjunction with the accompanying drawings.

SHORT DESCRIPTION OF THE DRAWINGS

DESCRIPTION OF THE PREFERRED EMBODIMENT

Figure 1:
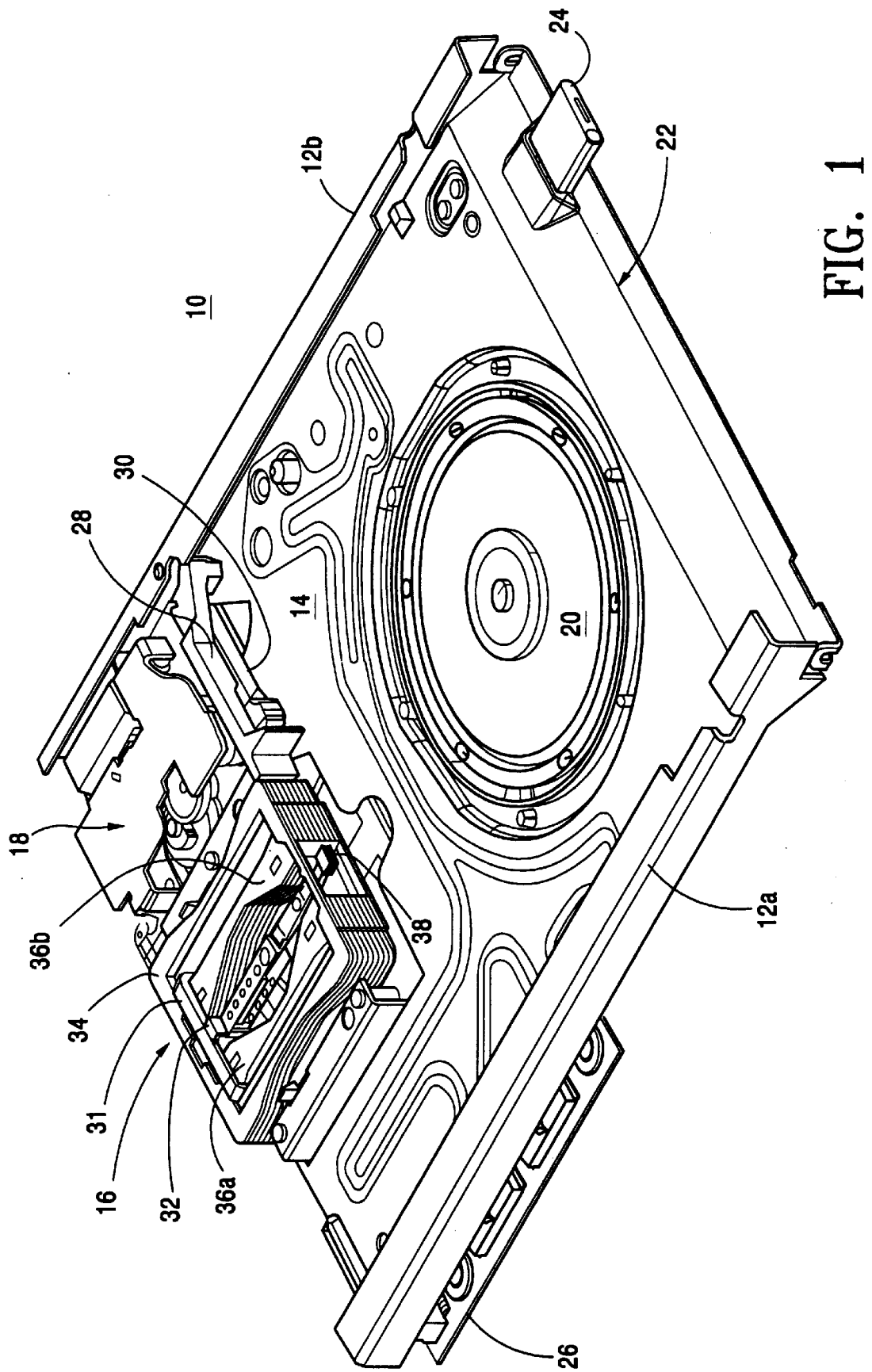
FIG. 1 is a perspective view of an exemplary disk drive in which the present invention is employed.

FIG. 1 shows an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a voice coil motor including a coil 31 mounted on a carriage assembly 32, an outer magnet return path assembly 34, and two inner return paths 36a, 36b on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 3:
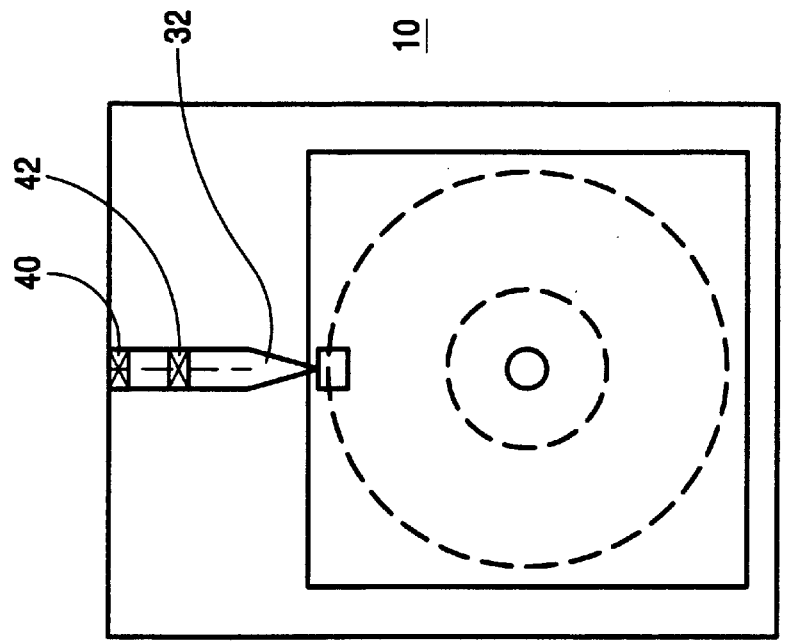
FIGS. 3 and 3A are diagrammatic views of a disk drive embodying the present invention showing the carriage assembly in the same two extreme positions.
Figure 2:
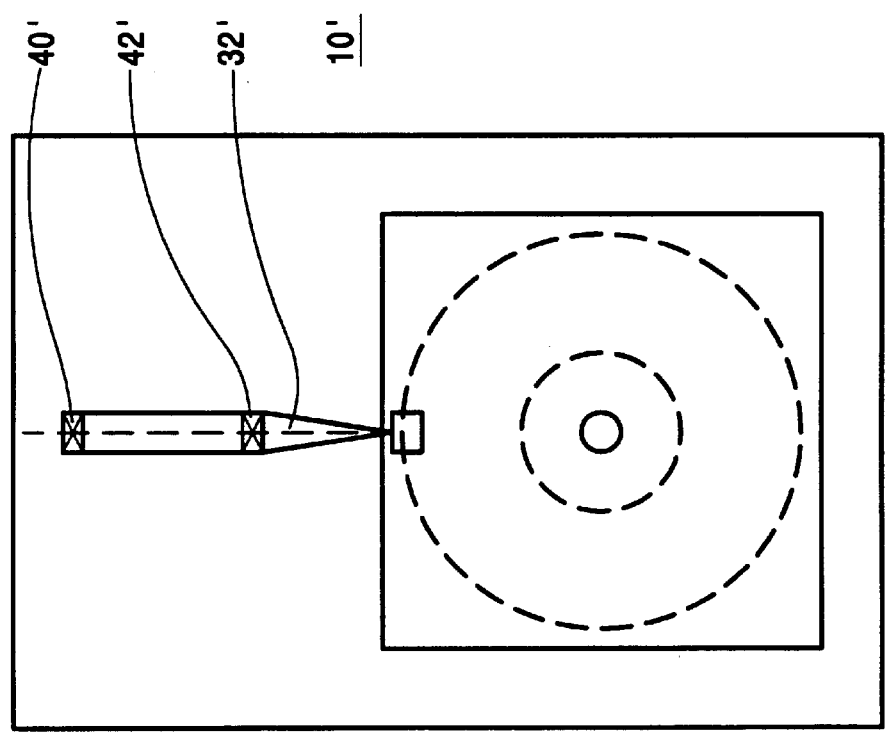
FIGS. 2 and 2A are diagrammatic views of a disk drive of the prior art showing the carriage assembly in two extreme positions.
Figure 3A:
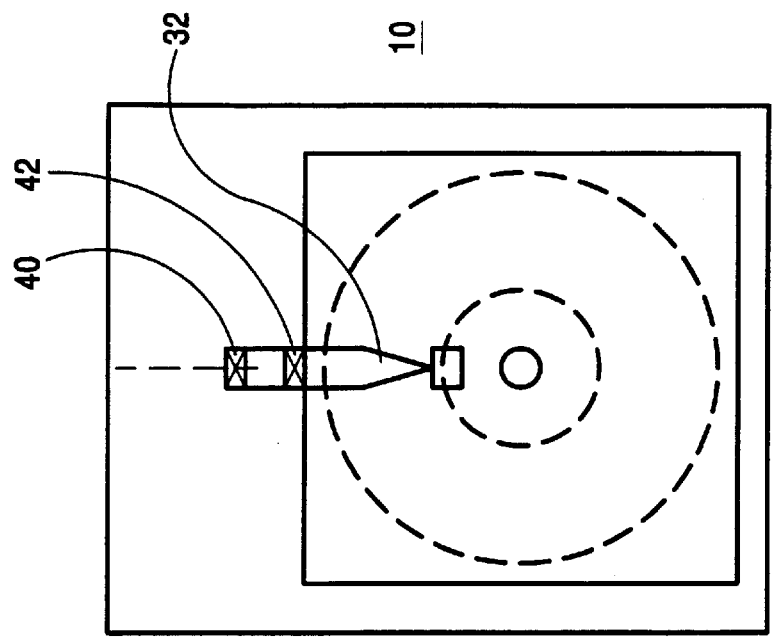
Figure 2A:
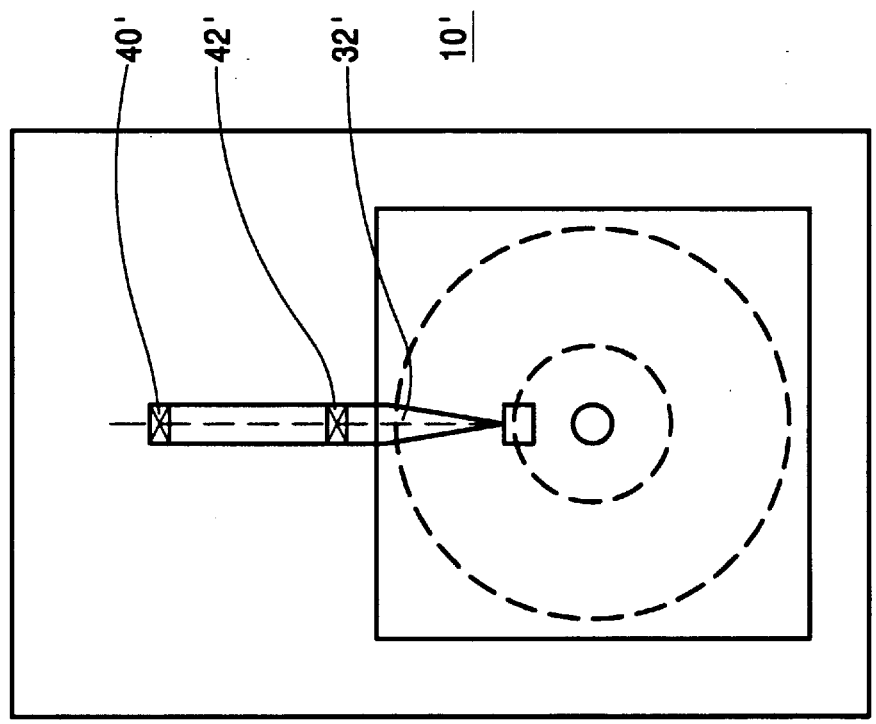
Figure 5:
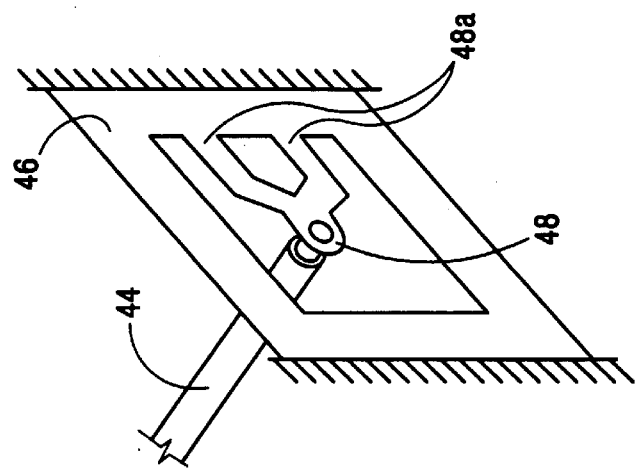
FIG. 5 is a perspective view of the flexure shown in FIG. 4.
Figure 4:
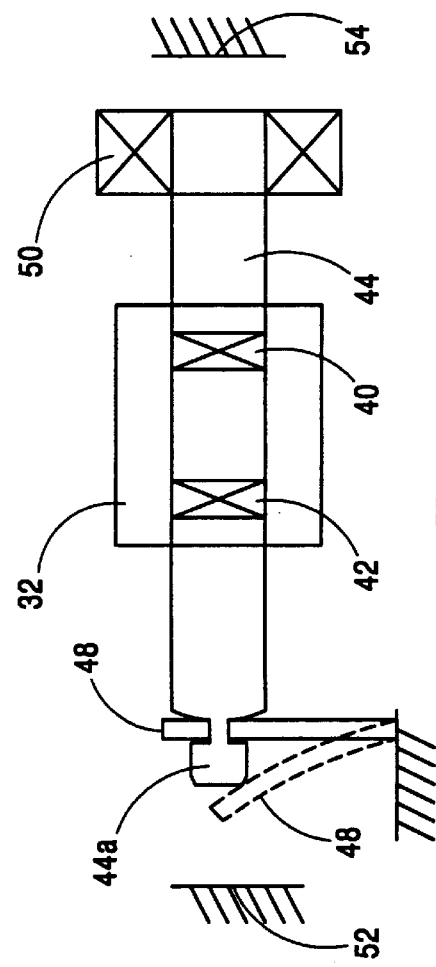
FIG. 4 is a diagrammatic view of a flexible suspension for mounting a carriage assembly in accordance with the present invention.
Figure 5A:
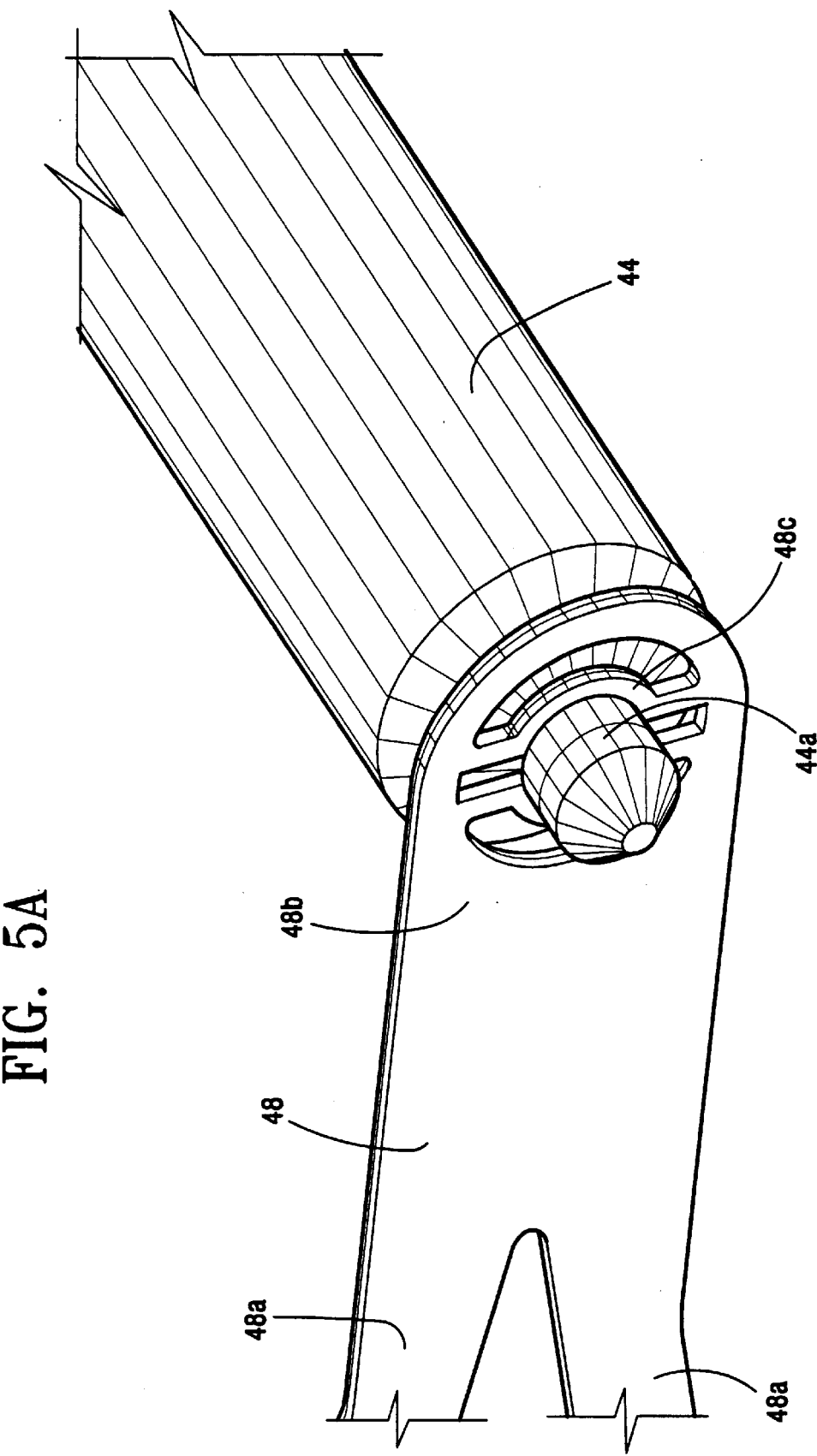
FIG. 5A is a fractional perspective view on enlarged scale showing the flexure shown in FIG. 5.
Figure 6:
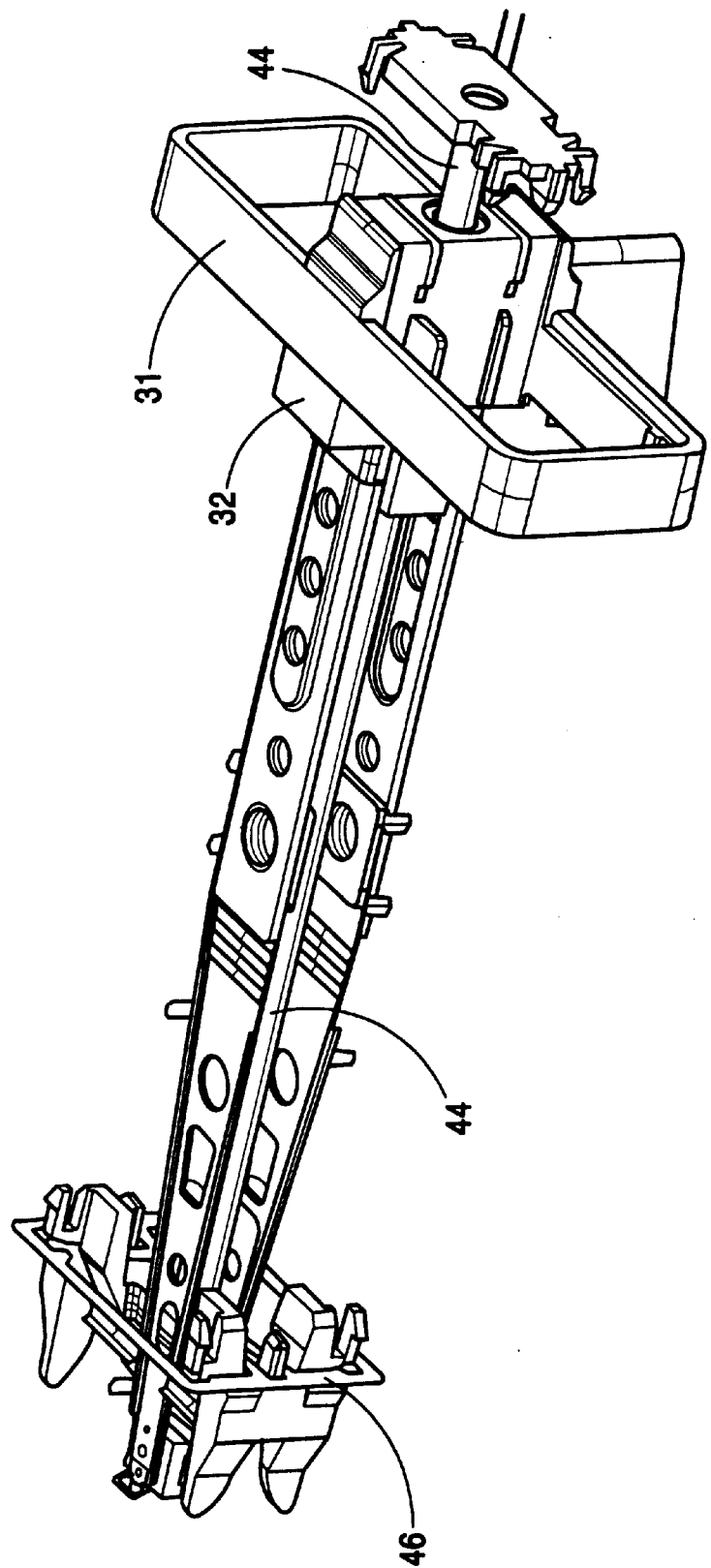
FIG. 6 is a perspective view on enlarged scale of the flexible suspension for mounting the carriage assembly of FIG. 1 as diagrammatically shown in FIG. 4.
Figure 6A:
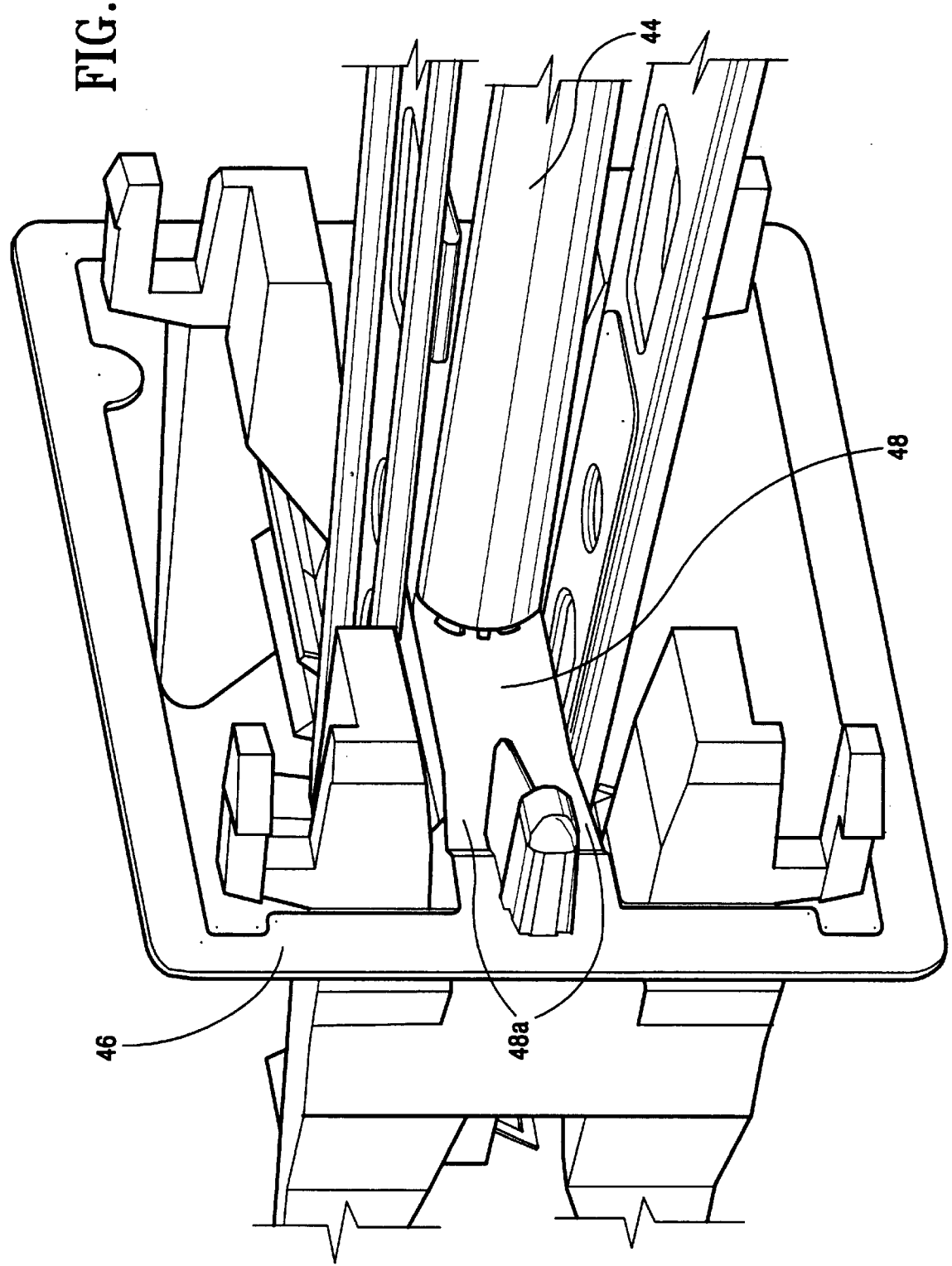
FIG. 6A is a partial perspective view on enlarged scale of the front flexure shown in FIG. 6.

As referred to earlier in this application, the prior art ZIP™ disk drive is substantially longer than the disk drive 10 of the present invention. This is diagrammatically illustrated by comparing FIGS. 2 and 3 and FIGS. 2A and 3A where the ZIP drive 10' is shown in FIGS. 2 and 2A and the present drive 10 is shown in FIGS. 3 and 3A. In the ZIP drive 10' the carriage bearings 40', 42' may be spaced apart a substantial distance, e.g. about 18 mm. and there is still substantial room for the carriage at either end of its travel as shown in FIGS. 2 and 2A. As pointed out above, the drive for use in laptop and notebook computers must be no longer than 135 mm. In view of this, the spacing between the bearings 40 and 42 is reduced to only 7 mm and there is substantially no room at the ends of the travel of the carriage. The carriage assembly 32 is mounted on the spaced bearings 40, 42 which in turn are mounted on a central guide track 44 on which the carriage assembly 32 slides linearly. The central guide track 44 may be in the form of a round polished stainless steel rod and is best seen in FIGS. 4 and 6. The bearing 40 and 42 have a low coefficient of friction and preferably are zirconia bearings. A flexible suspension is provided for mounting the central guide track 44 for linear movement by the carriage assembly 32 so that initial linear movement of the carriage assembly is by flexing the suspension and further, larger, linear movement of the carriage assembly is by sliding along the guide track 44. As shown in FIGS. 4 and 6, the front end of the guide track 44 is suspended by a flexure 46. As may be seen in FIG. 5 the flexure 46 has been illustrated in the form of a flat spring member having a rectangular mounting frame with a central opening. The frame 46 is adapted to be held in fixed position, and a flexible portion 48 extends from one side of the frame into the central opening. The flexible portion 48 of the spring member is connected to the frame by a pair of legs 48a. The flexible portion 48 also includes a free end 48b for connection to the front end 44a of the central guide track 44. The free end of 48b at the flexible portion 48 may be connected to the end of the central guide track 44 in any suitable manner such as by a slip fit, adhesive or a snap connection. The snap connection is preferred and is illustrated on enlarged scale in FIG. 5A where the flexible portion 48 of the spring member 46 includes cut-out structure at 48c for making a snap connection with the end 44a of the central guide track 44.

The rear end of the central guide track 44 is constrained by a zirconia bearing 50 which allows for axial travel of the central guide track 44. Placement of the bearing 50 at the rear of the rod 44 takes advantage of the lower reaction force at this end of the rod at the ID tracks on the disk, where the linear velocity is lowest and head drag increased. Stop structures 52 and 54 are provided at both ends of the central guide track 44 to limit the travel of the guide track to about ±300 microns. The flexible portion 48 of the spring 46 has a spring rate of 10–30 grams force/mm (1f–2f runout), and may be made from any suitable material such as stainless steel or beryllium copper. The spring rate is chosen such that the resonant frequency of the system falls within the range of 50 to 70 hz, where it takes less energy to track follow at the 1f runout frequency (3,000 rpm). The carriage assembly 32 of the actuator (containing the read/write heads and jewel bearings) ride along the central guide track or rod 44 to allow tracks to be reached on the disk. This system allows the rod or central guide track 44 to move with the actuator carriage for a short distance (about 200 microns) during track following. During the long peaks, the flexible portion 48 of the flexure 46 bends until the rod 44 is in contact with the hard stop 52. Then the actuator carriage 32 slides on the rod 44 until the desired track on the disk is reached. Track following can then resume at this location.

Figure 7:
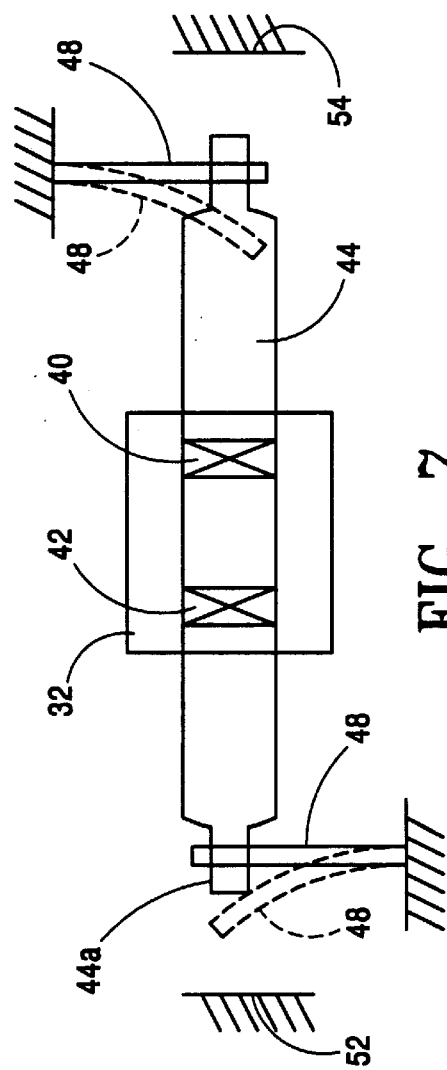
FIG. 7 is a diagrammatic view of another embodiment of the flexible suspension for mounting the carriage assembly in accordance with the present invention.

The present invention allows a much lower coefficient of friction to be used during track following. During long seeks in the cartridge, zirconia bearings slide along the rod. During track-following (when a lower coefficient of friction is desired) the cartridge bearings and rod move together as a unit and the flexure 46 allows the rod to move axially. Utilizing the flexible suspension system of the present invention the PES (error signal) is comparable to the longer ZIP drive 10' illustrated in FIG. 2 even though the bearings 40 and 42 are only 7 mm apart in the carriage whereas the ZIP cartridge bearings are 18 mm apart. The present arrangement allows for a very short drive length required for notebook computers. Referring to FIG. 7 there is diagrammatically illustrated another embodiment of the flexible suspension for mounting the carriage assembly in accordance with the present invention. This embodiment is similar to the embodiment diagrammatically illustrated in FIG. 4 except the rear end of the rod 44 is also suspended by a flexure 46A which is identical to the front flexure 46. The flexure 46A replaces the bearing 50. While the dual flexure system illustrated in FIG. 7 provides satisfactory friction reduction and friction linearization in the linear actuator for the disk drive, the use of the rear flexure 46A in the system is more fragile than the use of the bearing 50 shown in the support system in FIG. 4. The rear flexure 46A gets the most stress because it bears most of the weight of the carriage when it is in the parked position where the drive is often subject to the shocks encountered during shipment and installation. The bearing 50 of FIG. 4 withstands such stress better than the two flexure system of FIG. 7.

In both of the embodiments of the invention described herein the flexure supported rod 44 is free to move axially (in the direction of the actuator motion) for a small distance to accommodate 1f runout. For longer seeks of the actuator, the flexure 46 deflects until the spring force exceeds the frictional force of the bearings on the rod 44. At this point the head/carriage assembly 32 slides along the rod 44 to its new position.

The optimum spring rate for the rod-on-flexures system is in the range of 10–30 grams force/mm, which assures that the flexures will absorb approximately 3 to 5 tracks (36–60 microns) of motion without slippage of the bearings on the rod. The system has stops 52, 54 built in which limit the flexures to ±300 microns of motion. The typical motion of the flexures during random seeks can be as high as 250 microns (this maximum occurs during a long seek when the actuator velocity reaches a maximum).

The flexure supported rod concept allows the track-following behavior of the drive to approach that of a zero-friction system. This enables the linear actuator to adequately handle both 1f and 2f runout during track following. The sliding coefficient of friction (zirconia bearings on polished stainless steel) occurs only during long seeks. The flexured rod allows an extremely small and light actuator to be used. It facilitates high track density and higher capacities become possible.

While there have been described preferred and alternate embodiments of the invention, it will be understood that further modifications may be made without departing from the spirit and scope of the invention as set forth in the appended claims.

What is claimed is:

1. A disk drive having a linear actuator for carrying read/write heads into engagement with a recording medium comprising:
    a carriage assembly, said heads being mounted on said carriage assembly;
    a voice coil motor including a coil mounted on said carriage assembly for driving said carriage assembly into and out of engagement of said heads with said medium;
    a central guide track on which said carriage assembly slides linearly; and
    a suspension flexibly mounting said central guide track for linear movement so that initial linear movement of said carriage assembly is by flexing said suspension and further, larger, linear movement of said carriage assembly is by sliding along said guide track.

2. A disk drive according to claim 1 wherein said central guide track is suspended at one end by a flexure.

3. A disk drive according to claim 2 including stop means at both ends of said central guide track to limit the linear movement.

4. A disk drive according to claim 2 wherein said flexure has a spring rate of 10–30 grams force/millimeter.

5. A disk drive according to claim 2 wherein the spring rate of the flexure is predetermined such that the resonant frequency of the system is within the range of 50 to 70 Hz.

6. A disk drive according to claim 2 wherein said central guide track is suspended at each end by a flexure.

7. A disk drive according to claim 2 wherein said central guide track is suspended at a front end by a flexure and at a rear end by a bearing.

8. A disk drive according to claim 2 wherein said central guide track comprises a rod and the other end of said rod is constrained by a bearing allowing axial travel.

9. A disk drive according to claim 8 including stop means at both ends of said rod to limit the travel to about ±300 microns.

10. A disk drive according to claim 2 wherein said flexure comprises a spring member having a mounting frame with a central opening, a flexible portion extending from one side of said frame into said central opening, and said flexible portion including a free end for connection to one end of said central guide track.

11. A disk drive according to claim 10 wherein said flexible portion of said spring member is connected to said frame by a pair of legs.

12. A disk drive according to claim 10 wherein said free end of said flexible portion of said spring member includes structure for making a snap connection with the end of said central guide track.

13. A disk drive according to claim 10 wherein said spring member is made of stainless steel.

14. A disk drive according to claim 10 wherein said spring member is made of beryllium copper.

* * * * *